US010604297B2

(12) United States Patent
Lim

(10) Patent No.: US 10,604,297 B2
(45) Date of Patent: Mar. 31, 2020

(54) MODULAR PALLET AND MULTILAYER SUPPORT STRUCTURE

(71) Applicant: Jee Keng Lim, Singapore (SG)

(72) Inventor: Jee Keng Lim, Singapore (SG)

(*) Notice: Subject to any disclaimer, the term of this patent is extended or adjusted under 35 U.S.C. 154(b) by 0 days.

(21) Appl. No.: 16/089,769

(22) PCT Filed: May 16, 2016

(86) PCT No.: PCT/SG2016/050229
§ 371 (c)(1),
(2) Date: Sep. 28, 2018

(87) PCT Pub. No.: WO2017/200482
PCT Pub. Date: Nov. 23, 2017

(65) Prior Publication Data
US 2019/0144163 A1    May 16, 2019

(51) Int. Cl.
*B65D 19/00* (2006.01)
*A01G 9/12* (2006.01)
(Continued)

(52) U.S. Cl.
CPC .......... *B65D 19/0051* (2013.01); *A01G 9/12* (2013.01); *B65D 19/0028* (2013.01);
(Continued)

(58) Field of Classification Search
CPC ...... A01G 9/12; B65D 19/0051; B65D 19/40; B65D 2519/00567; B65D 2519/00273;
(Continued)

(56) References Cited

U.S. PATENT DOCUMENTS

| 4,838,176 A | 6/1989 | Bowser, Sr. et al. |
| 5,094,175 A * | 3/1992 | Christie ............ B65D 19/0069 108/56.1 |

(Continued)

FOREIGN PATENT DOCUMENTS

| CN | 102985328 | 3/2013 |
| TW | M469270 U | 1/2014 |
| WO | WO2008/030238 | 3/2008 |

OTHER PUBLICATIONS

International Search Report from Intellectual Property Office of Singapore dated Jun. 29, 2016 for relating International Application No. PCT/SG2016/050229 (ISR erroneously listed application No. as PCT/SG2016/050299 instead of PCT/SG2016/050229).
(Continued)

*Primary Examiner* — Daniel J Rohrhoff
(74) *Attorney, Agent, or Firm* — BakerHostetler

(57) ABSTRACT

A modular pallet for use in supporting and transporting goods. The modular pallet comprises a plurality of hollow legs integral to an inner side of the sidewall and a plurality of interlocking means integral to an outer side of the sidewall for coupling other modular pallets laterally, wherein each of the hollow legs comprises a top opening aligned with the top surface of the pallet and a bottom opening further away from the bottom surface of the pallet, and a top groove along a peripheral edge of the top opening and a bottom groove along a circumference of the hollow leg adjacent to the bottom surface. A multilayer support structure comprises at least two layers of the modular pallets separated by a plurality of hollow support columns for being positioned under the ground to support a hardscape/softscape disposed thereon while enable for tree roots growth, water drainage and storage of utilities.

10 Claims, 7 Drawing Sheets

(51) Int. Cl.
  *B65D 19/40* (2006.01)
  *B65D 19/04* (2006.01)

(52) U.S. Cl.
  CPC .............. *B65D 19/04* (2013.01); *B65D 19/40* (2013.01); *B65D 2519/00034* (2013.01); *B65D 2519/00069* (2013.01); *B65D 2519/0094* (2013.01); *B65D 2519/0097* (2013.01); *B65D 2519/00104* (2013.01); *B65D 2519/00243* (2013.01); *B65D 2519/00273* (2013.01); *B65D 2519/00288* (2013.01); *B65D 2519/00293* (2013.01); *B65D 2519/00308* (2013.01); *B65D 2519/00567* (2013.01); *B65D 2519/00587* (2013.01); *B65D 2519/00746* (2013.01); *B65D 2519/00756* (2013.01)

(58) Field of Classification Search
  CPC .. B65D 2519/00303; B65D 2519/0097; B65D 2519/00587
  See application file for complete search history.

(56) References Cited

U.S. PATENT DOCUMENTS

| | | | | |
|---|---|---|---|---|
| 5,483,899 | A | * | 1/1996 | Christie .............. B65D 19/0073 108/56.3 |
| 7,779,764 | B2 | * | 8/2010 | Naidu ................ B65D 19/0095 108/57.26 |
| 8,701,570 | B2 | * | 4/2014 | Wilson ............... B65D 19/0016 108/54.1 |
| 2008/0127865 | A1 | | 6/2008 | Tung-Cheng |
| 2012/0298014 | A1 | * | 11/2012 | Wilson ............... B65D 19/0016 108/53.1 |
| 2016/0288951 | A1 | * | 10/2016 | Rader ................ B65D 19/0016 |

OTHER PUBLICATIONS

Written Opinion Intellectual Property Office of Singapore dated Jun. 29, 2016 for relating International Application No. PCT/SG2016/050229 (Written Opinion erroneously listed application No. as PCT/SG2016/050299 instead of PCT/SG2016/050229).

\* cited by examiner

MODULAR PALLET AND MULTILAYER SUPPORT STRUCTURE

FIELD OF THE INVENTION

This invention relates to a modular pallet for supporting and transporting goods. More particularly, this invention relates to a multilayer support structure which comprises multiple layers of the modular pallets separated by support columns. The multilayer support structure is positioned under the ground for supporting a hardscape/softscape on the above, and at the same time enables for tree roots growth, water drainage, and/or storage of utilities (e.g. piping and wiring) within the structure.

BACKGROUND OF THE INVENTION

A pallet is a structure used for supporting and transportation of goods. Typically, pallets are made of wood which is relatively heavy and prone to wear and tear. Therefore, frequent maintenance and replacement of the damaged pallets are necessary. Further, wooden pallets have impact on deforestation and are less amenable for recycling. Also, these pallets cannot be coupled together to form a bigger unit for supporting larger or more goods. In view of this, there exists the need for a lightweight, durable, and connectable pallet.

In landscaping and gardening activities, hardscape (e.g. pavement, patio, roadway, parking, etc.) and softscape (e.g. tree, flower, and other vegetation) are often used to make the environment more aesthetically pleasing and healthy living. In order to keep the hardscape/softscape in place and mitigate damages to them due to poor soil structure, a strong support structure may be positioned under the ground on which the hardscape/softscape is installed. The support structure may also include a water controlling/treatment system that helps in collecting, treating and/or draining water under the ground. Typically, such support structures can be large scale, complex, and costly to implement. In view of this, there exists the need for a scalable support structure that is less costly, easy to manufacture and implement.

SUMMARY OF THE INVENTION

The above and other problems are solved and an advance in the art is made by provision of a modular pallet for use in supporting and transporting goods, and a scalable multilayer support structure formed by the modular pallets for positioned under the ground to support a hardscape/softscape.

A first advantage of this invention is that, due to its functional design and the material used, the modular pallet is strong, lightweight, durable, low cost, environmental friendly, and easy to manufacture. A second advantage of this invention is that a plurality of the modular pallets can be easily coupled together to form a matrix of pallets for use in supporting larger or more goods, or to form a three-dimensional multilayer support structure for positioned under the ground to support a hardscape/softscape. A third advantage of this invention is that the multilayer support structure is scalable to any desirable size, and can be disassembled easily with minimum effort. A fourth advantage of this invention is that the multilayer support structure has considerable void spaces that allow tree roots (particularly deep roots) to grow freely within the structure and directed away from the above/adjacent hardscapes, thereby minimising conflicts between the tree roots and the hardscapes (e.g. concrete pavement). A fifth advantage of this invention is that the multilayer support structure allows fluid communication between the layers of pallets and hence keeps the tree roots sufficiently moisture and at the same time helps in draining excess water in the structure. A sixth advantage of this invention is that the considerable void spaces within the multilayer support structure can act as storage for utilities (e.g. piping and cables) under the ground. A seventh advantage of this invention is that the considerable void spaces between the layers of pallets may be filled with planting media to form different functional or nutrients zones within the multilayer support structure so as to promote the growth of the softscape. In this application, the terms "roots" and "tree roots" may be used interchangeably to mean any root for a tree, plant or other vegetation that would benefit from the described invention.

In accordance with some embodiments of this invention, a modular pallet is provided. The modular pallet comprises a top surface for supporting load; a bottom surface disposed below and parallel to the top surface; a sidewall extending from a peripheral edge of the top surface to a peripheral edge of the bottom surface defining a main body by the top surface, the bottom surface and the sidewall; a plurality of hollow legs integral to an inner side of the sidewall and extending downwardly from the top surface; and a plurality of interlocking means integral to an outer side of the sidewall for coupling two or more modular pallets together to form a matrix of pallets laterally. The main body is divided into a plurality of support sections with each support section comprises a network of reinforcing ribs extending vertically from the top surface to the bottom surface forming a honeycomb-like structure having void spaces from the top surface to the bottom surface. The network of reinforcing ribs nearer to the sidewall is configured to be more compacted than the network of reinforcing ribs away from the sidewall to enhance the rigidity of the modular pallet. Each of the hollow legs comprises a top opening aligned with the top surface and a bottom opening further away from the bottom surface such that a gap is created between the bottom surface and the bottom openings of the hollow legs which should at least permit unobstructed insertion of the forks of a forklift truck into the gap. Each of the hollow legs comprises a top groove along a peripheral edge of the top opening and a bottom groove along a circumference of the hollow leg adjacent to the bottom surface.

In accordance with many embodiments of this invention, a multilayer support structure for positioning under a ground to support a hardscape/softscape on the above is provided. The multilayer support structure comprises a plurality of the modular pallets (as described above) configured to form at least two layers of pallets with each layer comprises one or more modular pallets coupled laterally by the interlocking means, wherein the honeycomb-like structure of the modular pallet allows tree roots, fluid and/or planting medium to pass through from the top surface to the bottom surface; a plurality of support columns disposed between the at least two layers of pallets wherein each of the support columns is an elongated hollow structure with two opening ends adapted to be releasably engagable with the top groove of one hollow leg and the bottom groove of another hollow leg, wherein the support columns and the hollow legs should at least allow fluid to pass through; and a plurality of void spaces created in between the at least two layers of pallets separated by the support columns wherein the void spaces enable for tree roots growth, water drainage, and/or storage of utilities within the multilayer support structure.

In accordance with some embodiments of this invention, the reinforcing ribs are intersecting with each other at any suitable angles between 0° and 360°. In other embodiments, the reinforcing ribs are intersecting with each other and arranged to be in perpendicular, parallel and diagonal with respect to the sidewall.

In accordance with some embodiments of this invention, the plurality of support sections comprise four equally sized support sections.

In accordance with some embodiments of this invention, the main body is formed in a square shape with four corners. The plurality of hollow legs comprise four hollow legs positioned at the four corners of the main body.

In accordance with some embodiments of this invention, each of the hollow legs is formed in a cylindrical shape. Each of the support columns is formed in a cylindrical shape.

BRIEF DESCRIPTION OF THE DRAWINGS

The above and other features and advantages of this invention are described in the following detailed description of preferred embodiments with reference to the below figures.

DETAILED DESCRIPTION OF THE INVENTION

A first aspect in accordance with this invention relates to a modular pallet for use in supporting and transporting goods. This modular pallet is transportable by a forklift truck from one place to another place. A second aspect in accordance with this invention relates to a scalable multilayer support structure comprises multiple layers of the modular pallets for supporting a hardscape/softscape on the above, and at the same time enables for tree roots growth, water drainage and/or storage of utilities (e.g. piping and cables) within the structure.

Figure 1:
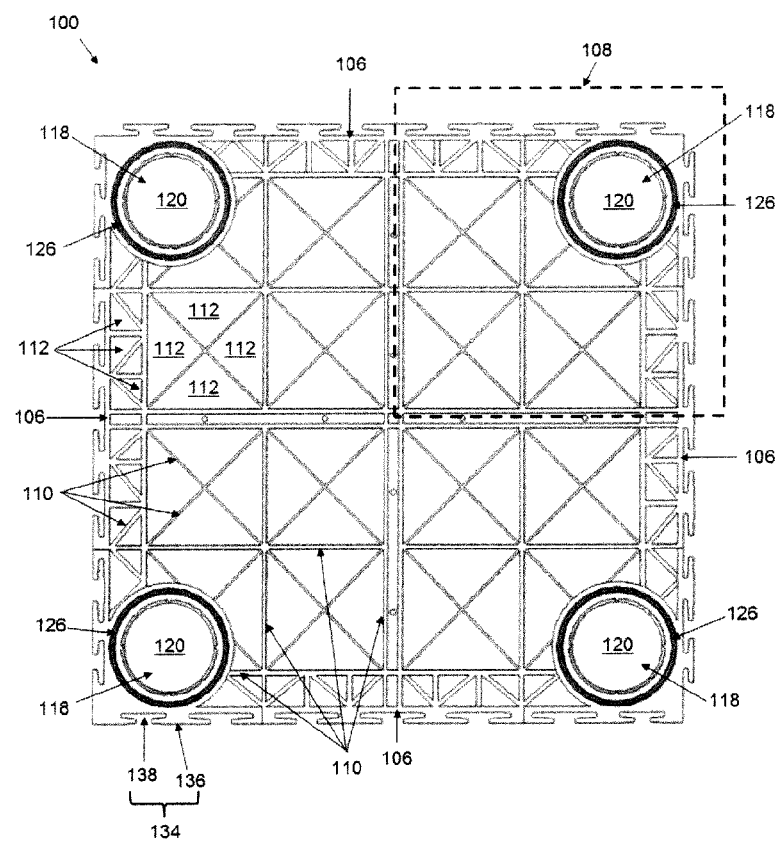
FIG. 1 is a direct top view of a modular pallet in accordance with an embodiment of this invention.
Figure 2:
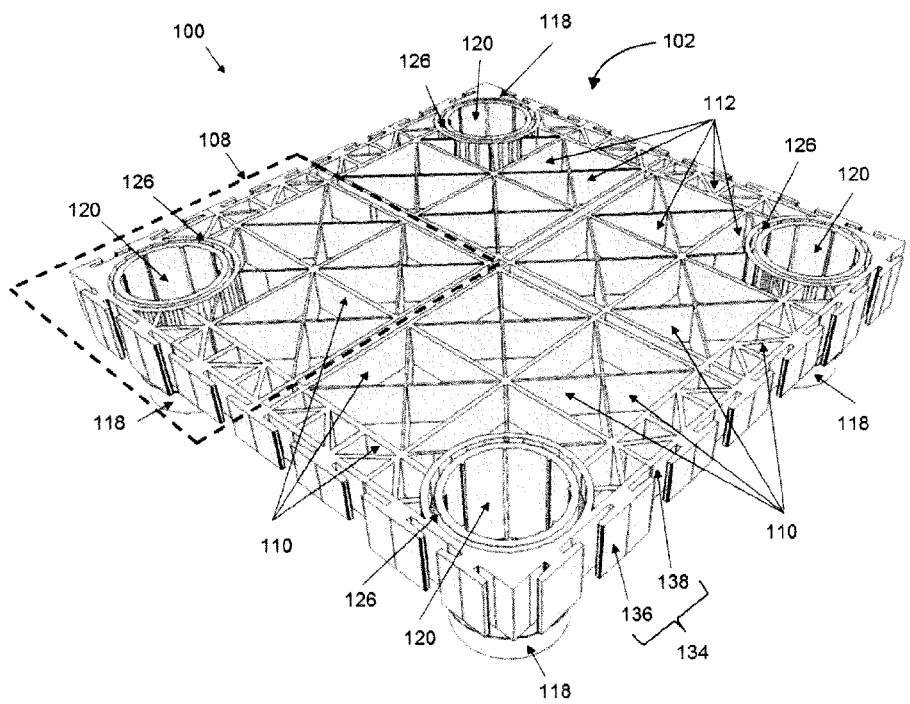
FIG. 2 is a top perspective view of the modular pallet as illustrated in FIG. 1.
Figure 3:
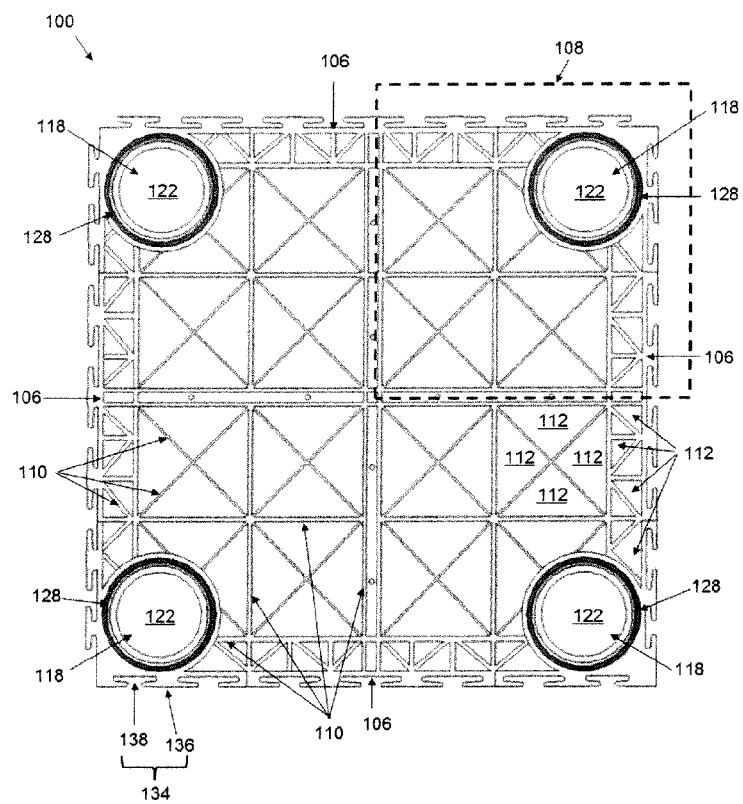
FIG. 3 is a direct bottom view of the modular pallet of FIG. 1.
Figure 4:
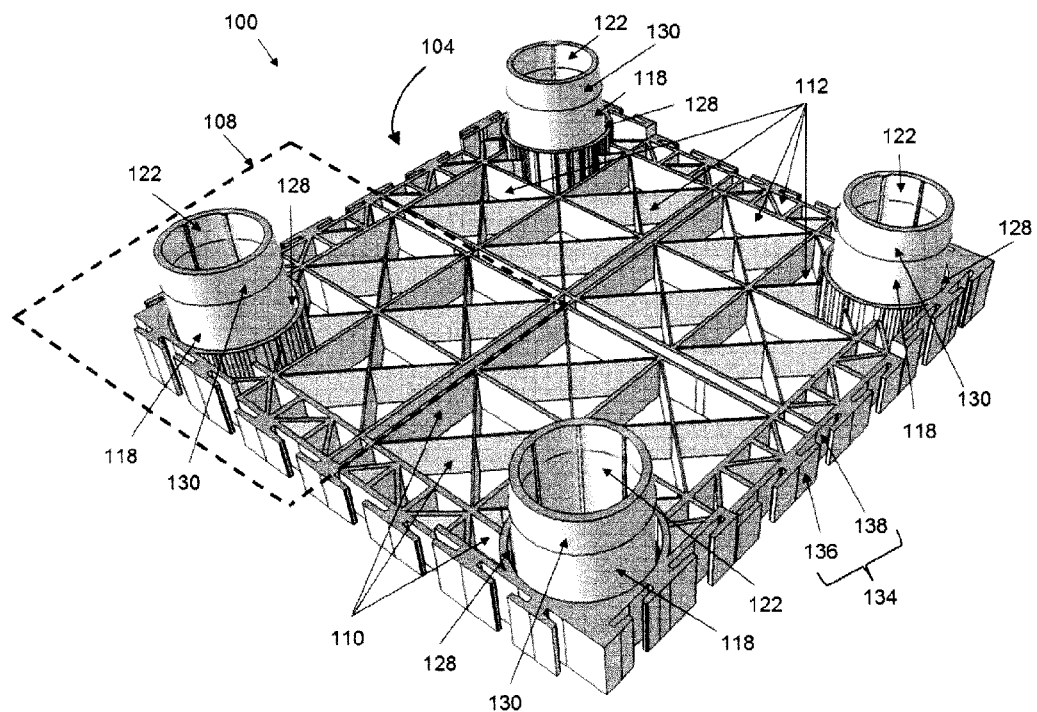
FIG. 4 is a bottom perspective view of the modular pallet as illustrated in FIG. 3.
Figure 5:
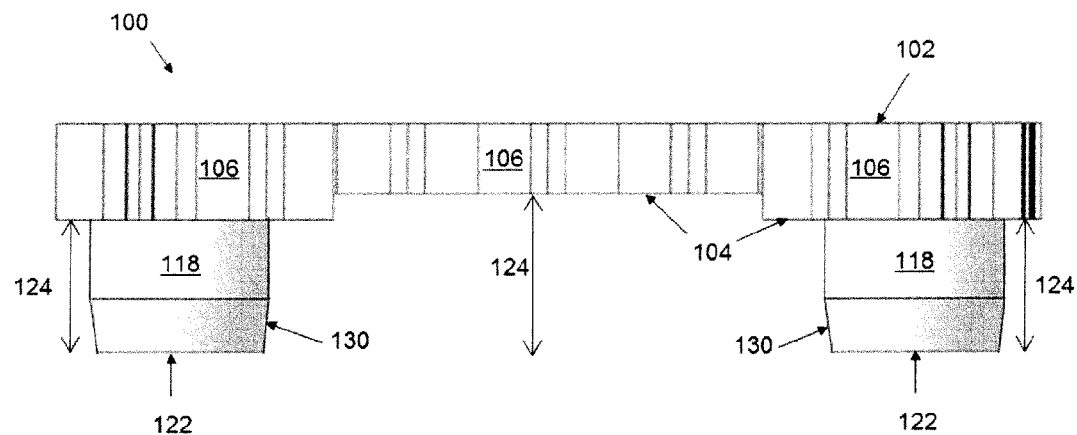
FIG. 5 is a side view of a modular pallet in accordance with an embodiment of this invention.

FIGS. 1 and 2 illustrate a direct top view and a top perspective view of a modular pallet 100 in accordance with an embodiment of this invention. FIGS. 3 and 4 illustrate a direct bottom view and a bottom perspective view of modular pallet 100. FIG. 5 illustrates a side view of modular pallet 100. Modular pallet 100 is a single-piece moulded structure made of polyproplyene (or other suitable materials) which is strong, durable, lightweight, low cost, waterproof and capable of supporting heavy loads. Modular pallet 100 is easy to manufacture with a single mould, and can withstand prolonged exposure to moisture and shows little wear and tear when roughly handled. Two or more modular pallets 100 are nestable with one another and hence occupy a minimum space during storage or shipment.

Modular pallet 100 comprises a top surface 102, a bottom surface 104, and a sidewall 106 extending from the peripheral edge of top surface 102 to the peripheral edge of bottom surface 104. A main body is thus defined by top surface 102, bottom surface 104 and sidewall 106. Top surface 102 should be relatively flat (planar) so that goods can rest on it steadily, even during transportation of modular pallet 100 by a forklift truck. Bottom surface 104 is also relatively flat (planar), substantially parallel to top surface 102, and should not obstruct the forks of a forklift truck from entering into the gap below bottom surface 104. The main body of modular pallet 100 may be in any suitable shapes (e.g. rectangular, square, polygon, etc.) and sizes. For example, the main body may be in a square shape (viewing from top or bottom as illustrated in FIGS. 1 and 3) with dimensions of about 0.55×0.55×0.04 m (length×width×height), i.e. top surface 102 and bottom surface 104 is a square of about 0.55×0.55 m and sidewall 106 has a height of about 0.04 m.

The main body of modular pallet 100 is divided into a plurality of support sections 108 which may be in any suitable size and shape. For example, as shown in FIGS. 1 to 4, the main body is divided into four equally sized support sections 108, and each support section 108 may have dimensions of about 0.27×0.27×0.04 m (length×width×height). Each of the support sections 108 comprises a network of reinforcing ribs 110 extending vertically from top surface 102 to bottom surface 104, forming a honeycomb-like structure or mesh pattern across top surface 102 and bottom surface 104 (viewing from top or bottom as illustrated in FIGS. 1 and 3) with void spaces 112 created therein. These void spaces 112 may be same or different sizes. The honeycomb-like structure provides structural strength and rigidity for modular pallet 100 and helps in distributing the weight of the goods across top surface 102. Reinforcing ribs 110 are arranged to be intersecting with each other at any suitable angles between 0° and 360°, such as 45°, 90° and 180° (viewing from top or bottom). For example, the intersecting reinforcing ribs 110 may be in perpendicular, parallel and/or diagonal with respect to sidewall 106. The network of reinforcing ribs 110 may be in different compactness across support section 108 and hence the main body. For example, as shown in FIGS. 1 to 4, the network of reinforcing ribs 110 nearer to sidewall 106 is more compacted (closer to each other) than other area so as to enhance the rigidity of modular pallet 100.

Figure 6:
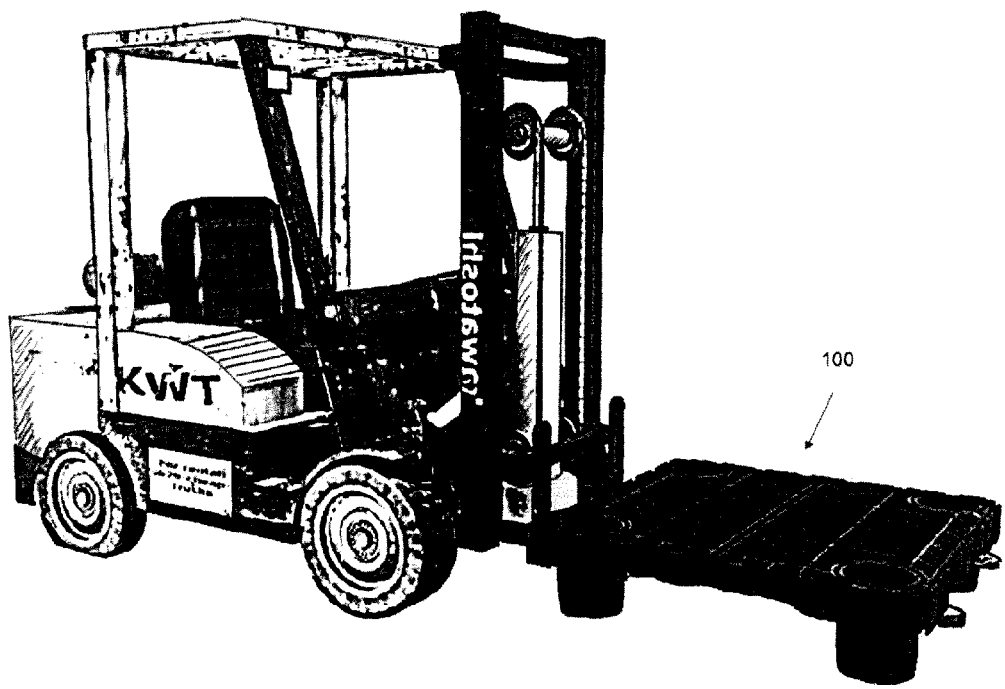
FIG. 6 illustrates a modular pallet of FIG. 1 being lifted by a forklift trunk.

Modular pallet 100 comprises a plurality of legs 118 which are integrally formed at an inner side of sidewall 106 and connected to some of the reinforcing ribs 110. The plurality of legs 118 are extending downwardly from top surface 102 and properly spaced from one another so that modular pallet 100 can rest on a surface firmly and steadily. For example, modular pallet 100 may have four legs 118 positioned at four corners of a square main body, as shown in FIGS. 1 to 4. Legs 118 may be formed in any suitable shapes (e.g. cylindrical, rectangular, triangle) and sizes. For example, as shown by the embodiment in the figures, leg 118 is cylindrical with a diameter of about 0.095 m and a height of about 0.13 m. Preferably, leg 118 is a hollow structure comprises a top opening 120 and a bottom opening 122 that allow fluid to pass through the leg. Top opening 120 is aligned with top surface 102 so that they are in line with each other. Bottom opening 122 is further away from bottom surface 104 such that a gap 124 is created between bottom surface 104 and bottom opening 122. Gap 124 should at least permit unobstructed insertion of the forks of a forklift truck into it. For example, the height of gap 124 may be about 0.09 m. FIG. 6 shows that a modular pallet 100 is being lifted up by a forklift truck.

Figure 9:
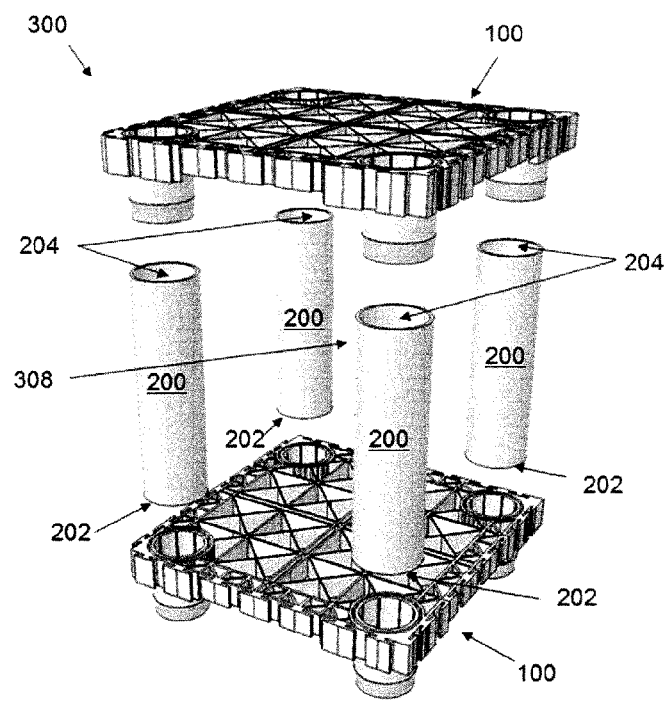
FIG. 9 illustrates two modular pallets to be engaged with a plurality of support columns to form a two-layer support structure in accordance with an embodiment of this invention.
Figure 10:
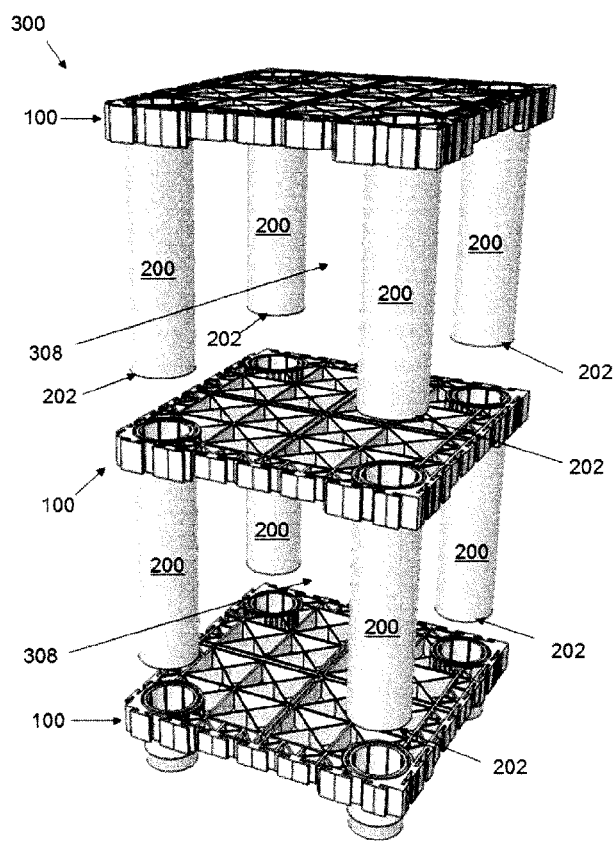
FIG. 10 illustrates three modular pallets to be engaged with a plurality of support columns to form a three-layer support structure in accordance with an embodiment of this invention.
Figure 11:
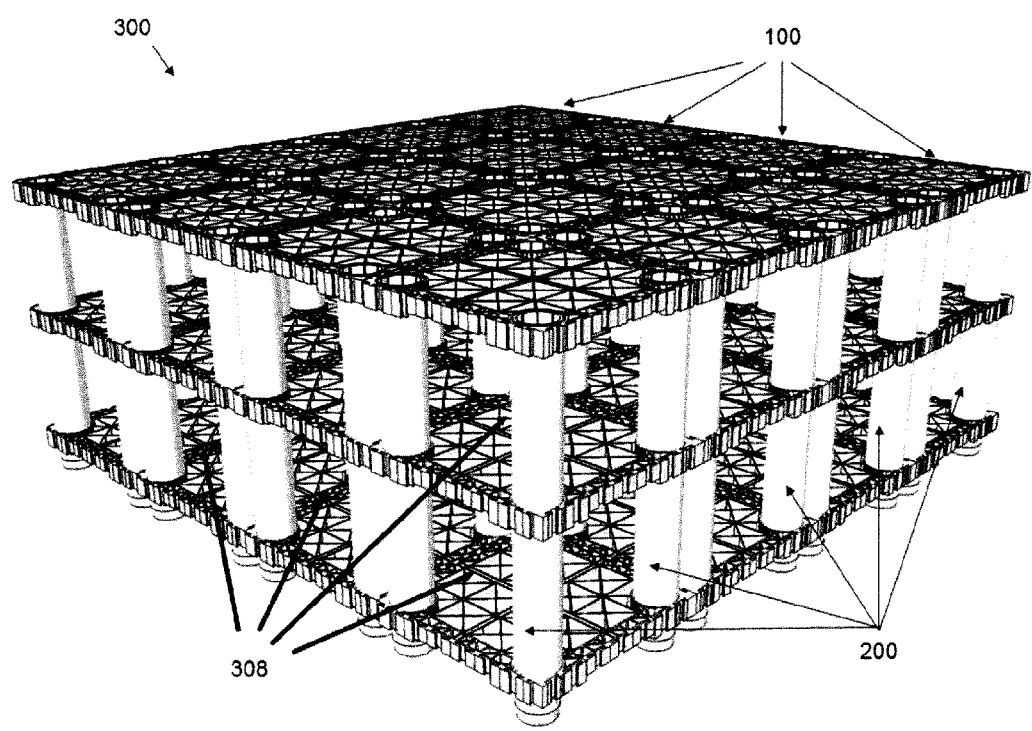
FIG. 11 is a perspective view a multilayer support structure in accordance with an embodiment of this invention.

Each of the legs 118 comprises a top groove 126 along the peripheral edge of top opening 120 (see FIG. 2) and a bottom groove 128 along the circumference of the leg 118 adjacent to bottom surface 104 (see FIG. 4). Grooves 126, 128 are in fact deep narrow channels or slots configured to engage with corresponding structures which can be fitted into these grooves perfectly and securely. For example, grooves 126, 128 may have a width of about 0.0035 m. The corresponding structure may be a support column 200 which can be fitted into grooves 126, 128 to form an extended leg (see FIGS. 9 and 10). Each of the legs 118 has a tapered end portion 130 adjacent to bottom opening 122 that helps in guiding the corresponding structure to fit into bottom groove 128.

Figure 7:
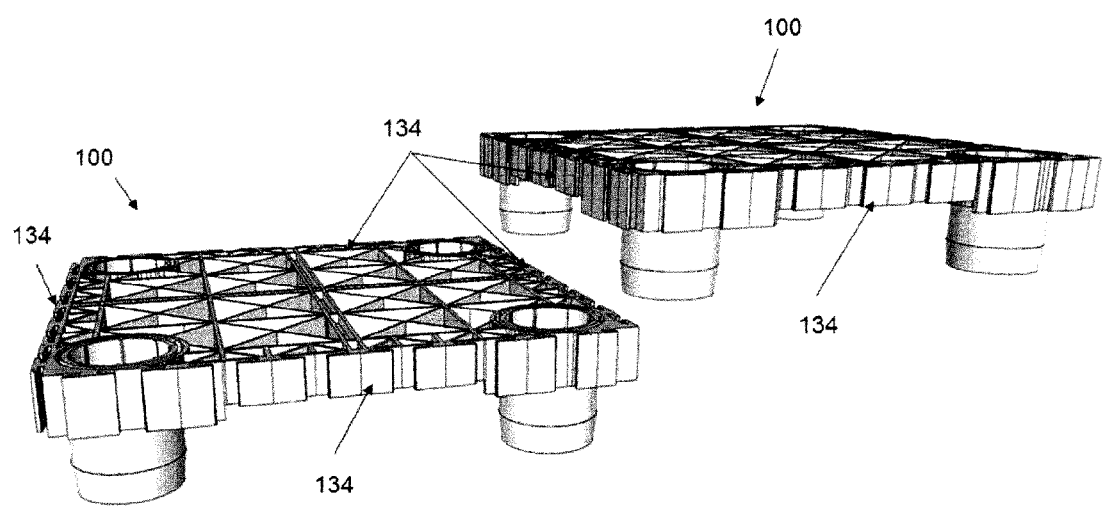
FIG. 7 illustrates two modular pallets to be coupled together laterally by the interlocking means in accordance with an embodiment of this invention.
Figure 8:
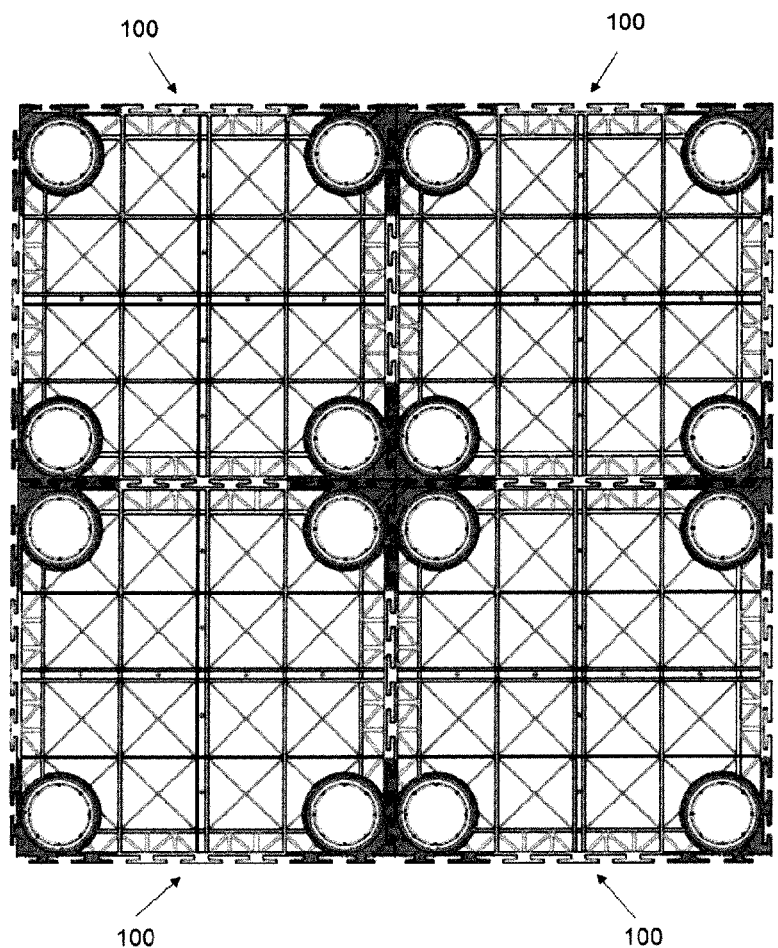
FIG. 8 is a top view of four modular pallets coupled together laterally to form a matrix of pallets in accordance with an embodiment of this invention.

Modular pallet 100 further comprises a plurality of interlocking means 134 which are integrally formed at an outer side of sidewall 106. These interlocking means 134 helps to couple two or more modular pallets 100 together to form a matrix of pallets laterally. As shown in FIGS. 1 to 4, interlocking means 134 may be a slot-type locking mechanism, which comprises a male tab part 136 and a matching female recess part 138 for interlocking with each other (without the need to use a separate fastener). Other locking mechanisms may also be used as long as they can couple two modular pallets 100 together securely. FIG. 7 shows that two modular pallets 100 can be coupled together at one side of sidewall 106 by interlocking means 134. FIG. 8 shows that four modular pallets 100 are coupled together laterally by interlocking means 134 to form a matrix of pallets.

Figure 12:
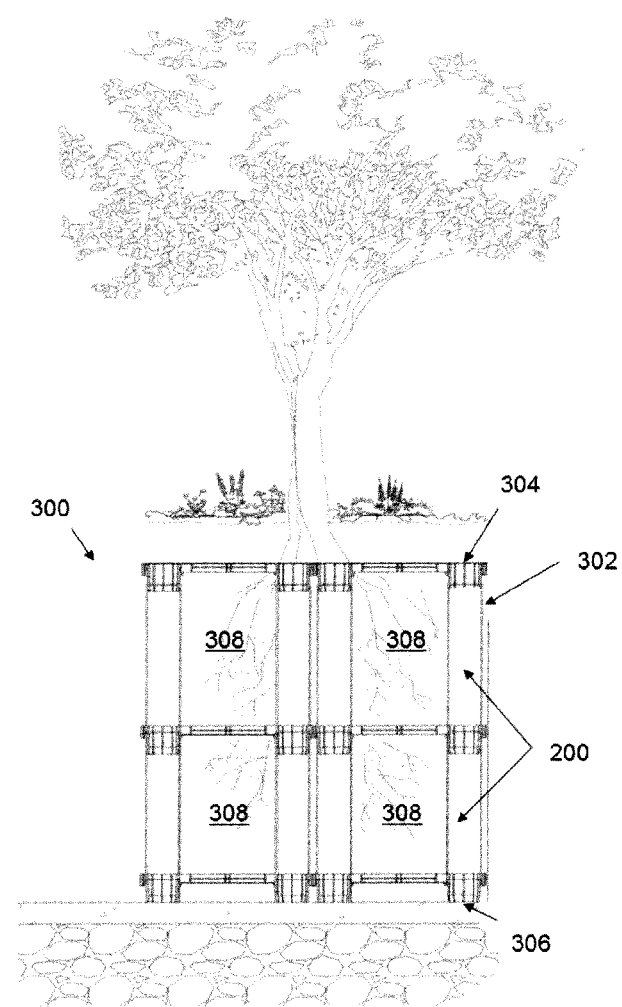
FIG. 12 is a side view of a multilayer support structure positioned under a tree in accordance with an embodiment of this invention.

In accordance with some embodiments of this invention, a plurality of modular pallets 100 can be coupled together to form a three-dimensional multilayer support structure 300, which comprises at least two layers of modular pallets 100 and each layer comprises one or more modular pallets 100 coupled together by interlocking means 134 (no coupling if one modular pallet 100 is used). Therefore, multilayer support structure 300 is modular in design that permits the flexibility of forming different sizes (i.e. scalable to a desirable size) to suit the complex urban environment landscape. For example, multilayer support structure 300 may be configured in different forms as shown in FIGS. 9 to 12. Multilayer support structure 300 is positioned under the ground for supporting a hardscape/softscape on the above, such as installed under a tree as shown in FIG. 12. In multilayer support structure 300, the honeycomb-like structure of the main body of modular pallet 100 should allow tree roots, fluid (e.g. rain water), and/or planting media to pass through from top surface 120 to bottom surface 122. Therefore, tree roots may grow freely from an upper layer to a lower layer, and may also extend through the structure and access the soil beyond the structure, thus increasing the soil volume accessible by roots. Similarly, water may flow from an upper layer to a lower layer of the structure, thereby avoiding dry regions within the structure and preventing stagnation of water.

Multilayer support structure 300 further comprises a plurality of support columns 200 disposed between two adjacent layers of modular pallets 100, which are releasably engageable with legs 118 of modular pallet 100. Therefore, in general, the number of support columns 200 is associated with the number of legs 118. For an example of modular pallet 100 with four legs 118, four support columns 200 may be connected between two modular pallets 100 (see FIG. 9), and eight support columns 200 may be connected between three modular pallets 100 (see FIG. 10). Support column 200 may in any suitable shape (e.g. cylindrical, rectangular, triangle) and size. Preferably, support column 200 is an elongated hollow structure (similar to leg 118) having two opening ends 202 and 204 for engaging with grooves 126 and 128 respectively. When engaging with bottom groove 128, the tapered end portion 130 of leg 118 helps to guide support column 200 to fit into bottom groove 128. As such, an extended elongated hollow structure may be formed when hollow support column 200 is engaged with hollow leg 118. This extended elongated hollow structure should at least allow fluid (e.g. rain water) to pass therethrough. For example, in FIG. 12, water may pass through the extended elongated hollow structure 302 from opening 304 at the top layer to opening 306 at the lowest layer, so that water can be supplied to the deeper end of the ground.

Depending on the length of support columns 200, many large void spaces 308 may be formed within multilayer support structure 300 between any two adjacent layers of modular pallets 100. These void spaces 308 provide access areas for tree roots and allow excess rain water to flow out the structure easily. These void spaces 308 may also be filled with planting media to create different functional or nutrients zones within the structure or act as storage areas for utilities (e.g. piping and cables) that are installed under the ground. In one embodiment, the sum of void spaces 308 (between the layers of modular pallets 100) and void spaces 112 (within the main body of modular pallet 100) is at least 80% of the total volume of multilayer support structure 300. This also means that multilayer support structure 300 is relatively lightweight as it contains many void spaces. Void spaces 308 may be increased significantly by using longer support columns 200.

While the present invention has been described in certain aspects and with reference to specific embodiments, it should be understood by those skilled in the art that various modifications and/or variations may be made to the invention without departing from the scope of the invention as broadly described and as set forth in the following claims. Thus, the embodiments should be considered in all respects as illustrative and not restrictive.

The invention claimed is:
1. A modular pallet comprising:
 a top surface for supporting load;
 a bottom surface disposed below and parallel to the top surface;
 a sidewall extending from a peripheral edge of the top surface to a peripheral edge of the bottom surface defining a main body by the top surface, the bottom surface and the sidewall, wherein the main body is divided into a plurality of support sections with each support section comprises a network of reinforcing ribs extending vertically from the top surface to the bottom surface forming a honeycomb structure having void spaces from the top surface to the bottom surface;

a plurality of hollow legs integral to an inner side of the sidewall and extending downwardly from the top surface, wherein each of the hollow legs comprises a top opening aligned with the top surface and a bottom opening further away from the bottom surface such that a gap is created between the bottom surface and the bottom openings of the hollow legs which should at least permit unobstructed insertion of the forks of a forklift truck into the gap, wherein each of the hollow legs comprises a top groove along a peripheral edge of the top opening and a bottom groove along a circumference of the hollow leg adjacent to the bottom surface; and a plurality of interlocking members integral to an outer side of the sidewall for coupling two or more modular pallets together to form a matrix of pallets laterally.

2. A multilayer support structure for positioning under a ground to support a hardscape/softscape above the ground, the multilayer support structure comprising:

a plurality of the modular pallets of claim 1 configured to form at least two layers of pallets with each layer comprises one or more modular pallets coupled laterally by the interlocking members, wherein the honeycomb structure of the modular pallet allows tree roots, fluid or planting medium to pass through from the top surface to the bottom surface;

a plurality of support columns disposed between the at least two layers of pallets wherein each of the support columns is an elongated hollow structure with two opening ends adapted to be releasably engagable with the top groove of one hollow leg and the bottom groove of another hollow leg, wherein the support columns and the hollow legs should at least allow fluid to pass through; and a plurality of void spaces created in between the at least two layers of pallets separated by the support columns wherein the void spaces enable for tree roots growth, water drainage, and/or storage of utilities within the multilayer support structure.

3. The modular pallet multilayer support structure of claim 2 wherein each of the support columns is formed in a cylindrical shape.

4. The modular pallet of claim 1 wherein the reinforcing ribs are intersecting with each other at any suitable angles between 0° and 360°.

5. The modular pallet of claim 1 wherein the reinforcing ribs are intersecting with each other and arranged to be in perpendicular, parallel and diagonal with respect to the sidewall.

6. The modular pallet of claim 1 wherein the plurality of support sections comprise four equally sized support sections.

7. The modular pallet of claim 1 wherein the main body is formed in a square shape with four corners.

8. The modular pallet of claim 7 wherein the plurality of hollow legs comprise four hollow legs positioned at the four corners of the main body.

9. The modular pallet of claim 1 wherein each of the hollow legs is formed in a cylindrical shape.

10. The modular pallet of claim 1 wherein a first set of one or more ribs in the network of reinforcing ribs is proximate the sidewall and a second set of one or more ribs in the network of reinforcing ribs is distal the sidewall wherein the one or more ribs in the first set of one or more ribs is more compacted than the one or more ribs in the second set of one or more ribs to enhance the rigidity of the modular pallet.

* * * * *